United States Patent Office 3,265,604

Patented August 9, 1966

3,265,604

PROCESS FOR POLYMERIZING UNSATURATED MONOMERS USING HIGH ENERGY IONIZING RADIATION

James T. Harlan, Jr., Torrance, and Edward R. Bell, Concord, Calif., assignors to Shell Oil Company, New York, N.Y., a corporation of Delaware No Drawing. Filed June 6, 1960, Ser. No. 33,960
20 Claims. (Cl. 204—159.24)

This invention relates to a process for polymerizing unsaturated monomers, and more particularly to a process for polymerizing unsaturated monomers using high energy ionizing radiation.

Specifically, the invention provides a new and highly efficient process for polymerizing ethylenically unsaturated monomers, and particularly those which are capable of being polymerized through an ionic polymerization mechanism, such as, for example, alpha-methylstyrene, using high energy ionizing radiation. The new process comprises exposing the ethylenically unsaturated monomer, which is preferably in a highly purified form, to high energy ionizing radiation, such as, for example, a high energy stream of electrons or photons, in the presence of finely divided solid particles of a metal halide and preferably an alkali metal halide, such as, for example, lithium chloride.

It has been found that certain ethylenically unsaturated monomers which polymerize via an ionic polymerization mechanism, such as isobutylene, can be polymerized by exposure to high energy ionizing radiation. Such a process, however, has never been considered commercially feasible because of certain serious deficiencies of the process. It has been found, for example, that in many cases the polymerization requires the use of very low temperatures and this requires considerable expense in refrigeration. In addition, the reaction is quite sensitive to oxygen and steps must be taken to use an inert atmosphere. Furthermore, the yield of polymer based on energy input is rather low compared to the yields obtained by using conventional polymerization initiators. This is generally expressed in terms of "G values," the number of molecules converted to polymer for every 100 electron volts energy absorbed. In many cases, the G values for this process run about 100–200, while for commercial applications values of at least 500, and preferably 1,000 to 50,000 are desirable.

It is an object of the invention, therefore, to provide a new process for polymerizing ethylenically unsaturated monomers using high energy ionizing radiation. It is a further object to provide a new process for polymerizing unsaturated monomers using high energy ionizing radiation. It is a further object to provide a process for polymerizing monomers with high energy radiation which gives a fast rate and high yield of polymer. It is a further object to provide a process for polymerizing monomers, such as alpha-methylstyrene, using high energy ionizing radiation which has a high energy yield. It is a further object to provide a method for polymerizing monomers with high energy radiation which does not require the use of very low temperatures. It is a further object to provide a radiation polymerization process which is less sensitive to oxygen. It is a further object to provide a method for polymerizing monomers with high energy radiation which can be used to effect cross-linking in a one-step procedure. It is a further object to provide a new process for preparing high molecular weight polymers having improved properties. These and other objects of the invention will be apparent from the following detailed description thereof.

It has now been discovered that these and other objects may be accomplished by the process of the invention which comprises exposing one or more ethylenically unsaturated monomers, and preferably those which are capable of being polymerized through ionic polymerization mechanism, such as, for example, alpha-methylstyrene, which is preferably in a purified form, to high energy ionizing radiation, such as, for example, a high energy stream of electrons or photons, in the presence of finely divided solid particles of a metal halide and preferably an alkali metal halide. It has been unexpectedly found that the presence of these special materials causes a surprising increase in the rate of polymerization, i.e., in the amount of monomer converted per unit of energy. With monomers, such as isobutylene, for example, G values have been raised from about 100–200 to as high as 50,000. In addition, the resulting polymers, though formed at a fast rate, have high molecular weights and attractive physical properties. Further advantage is also found in the fact that the process can be conducted at temperatures higher than those normally used with such monomers and still obtain high yields of polymers. The presence of the solids also makes the process less sensitive to oxygen. It has also been found that many of the above-noted inorganic activators can be retained in the resulting polymer without causing any deleterious effect on the resulting product. In this regard the process is superior to the use of many known accelerators which must be removed by extensive separation techniques before the product can be utilized.

It has also been unexpectedly found that by control of conditions, the process of the invention can also be utilized to not only effect polymerization, but also effect a cross-linking of the polymer to form an insoluble infusible product. Heretofore this has required a two-step process and could not have been accomplished at the same time as the polymerization.

The material to be used in the process of the invention includes the finely divided solid particles of a metal halide and preferably an alkali metal halide. Examples of these materials include, among others, potassium choloride, lithium chloride, lithium fluoride, lithium bromide, lithium iodide, sodium chloride, sodium bromide, potassium bromite, potassium iodide, cesium chloride, cesium, bromide and cesium iodide.

The above materials may be used singly or in combination or in admixture with other materials which tend to accelerate reaction such as metal oxides as zinc oxide.

The metal halide is finely divided and preferably has a mesh size between 30 and 600. Particularly good results are obtained when the mateiral has a mesh size between 50 and 500.

The metal halide may contain some water, but should not contain more than 8% by weight of water. Preferred amounts of water vary from .1% to 5% by weight.

Particularly superior results are obtained when the metal halide is preheated say at temperatures of the order of 50° C. to 200° C. before being utilized in the reaction. While the preheating may be accomplished in the presence of air, it is generally preferred to preheat in the presence of inert atmosphere, such as nitrogen, and maintain the resulting product in that atmosphere until it is utilized in the polymerization process.

The amount of the above-described metal halide to be used in the process may vary over a wide range depending on the material and the intended application of the resulting product. Amounts of metal halide have varied from amounts as small as .1% up to as high or higher than 200% by weight of the monomer being polymerized. Preferred amounts of the inorganic material vary from about 1% to 8% by weight of the monomer being polymerized.

The above-described metal halide may be added to the reaction mixture by any suitable means, and at various periods of time. The material may be added all at once at the beginning of the process or may be added intermittently during the source of the reaction. It is generally desirable to mix all of the salt with the monomer to be polymerized before the monomer is exposed to radiation.

The metal halides may be employed in a fixed bed or supported on a rigid surface or on a rotating drum or moving belt. In this case, the monomer can flow over the surface with ionizing radiation impinging on the surface at appropriate points. For example, the metal halides can be supported on inert materials such as sand or carbon or glass or the particles may be sprinkled on an adhesive material such as epoxy adhesive which can be subsequently cured to hold the particles during processing. The advantage of this technique is that the polymer may be recovered without having to separate the solid particles. This technique is particularly desirable when the polymer is soluble in its monomer or a solvent which is present.

The kind of radiation suitable for use in the present invention includes high energy electrons, protons and photons. Electron beams are suitably produced by electron accelerators such as the Van de Graaff, resonance transformers, and linear accelerators or by a suitable arrangement of certain isotopes, e.g., strontium 90. High energy photons suitable for use are, for example, X-ray produced by conventional X-ray tubes and electron accelerators and gamma rays which may be produced by decay of radioactive material such as cobalt 60, cesium 137 and fission products. Although somewhat different effects may be observed in irradiation by heavy particles, the present invention also contemplates particularly the use of the high energy protons or neutrons. Proton beams are produced, for example, by accelerators such as Van de Graaff, linear accelerators and cyclotrons. Fast neutrons may be obtained within a nuclear reactor or may be obtained as a beam out of a nuclear reactor. Fast neutrons act on hydrocarbons mainly by transferring their energy to protons, which, being charged, induce ionization and excitation as they pass through the monomer mixture.

The devices suitable for producing beams of electrons, protons, X-rays, fast neutrons and slow neutrons are well known in the art and need not be described herein in detail.

Methods and apparatus for irradiating materials by means of radiation resulting from decay of radioactive substances are also well known. Sources such as rods containing a high concentration of cobalt 60 are used in various arrangements for the irradiation of materials as described, for example, in the pertinent paper by Burton et al., Nucleonics, 13 (No. 10, 74 (1955)), and references cited therein.

A preferred process comprises exposing the monomer mixture to radiation by passing it through a nuclear reactor which may at the same time be employed for power producing purposes or may be utilized exclusively for polymerization. A suitable reactor is described in substantial detail in the Fermi et al. U.S. Patent 2,708,656.

Preferred ionizing radiation is that which has the power to penetrate to a substantial depth, i.e., at least about 1 centimeter, into a mass of the monomer in condensed phase. This is sometimes referred to herein as radiation of substantial penetrating power. In this operation, the monomer mass is exposed to such radiation from a source which is not finely dispersed within said mass. The radiation may be introduced into the condensed mass, held in a vessel, through a suitable window in the vessel or by placing an intensive source of radiation, such as a canned mass of gamma-ray emitter, into the vessel containing the monomer.

The total dosage needed to effect polymerization will vary with the various monomers. Preferred total dosage varies from about $10^5$ to $5\times10^6$ rads; dosages of up to $5\times10^7$ rads or more, calculated on the total mixture, may be employed if polymer is removed from the irradiation zone after it is formed. A rad is defined as 100 ergs of ionizing energy absorbed per gram of irradiated mixture.

The dosage rate will also vary considerably. Preferred dosage rates vary from about $10^4$ to $10^{12}$ rads per hour, and still more preferably $10^5$ to $10^{10}$ rads per hour. In systems in which the radiation reaches only a portion of the total mass of monomer contained in a vessel, e.g., where an electron beam penetrates only into the upper part of a vessel, the dose rate calculated on the basis of the amount of material in the volume actually reached by the radiation is called the "instantaneous dose rate." The above numerical values are applicable.

The temperature employed during the polymerization process may vary over a wide range. In general, temperatures may be as low as about −150° C. Preferred temperatures, particularly with monomers, such as the isoolefins, include the lower temperatures, such as −90° C. to 0° C. The temperatures employed in the process, however, may be higher than those used without the use of the finely divided solid material as noted hereinabove. The low temperatures if employed may be obtained by conventional techniques such as use of liquid nitrogen, Dry Ice, boiling ethylene and the like.

The process may be conducted at atmospheric, superatmospheric or subatmospheric pressures as desired. As it is preferred to conduct the reaction at low temperatures, the pressure used will generally be that needed to maintain the desired temperature.

The polymerization is preferably carried out in bulk or solvent solutions. "Bulk polymerization" is the accepted term for polymerization in the pure liquid monomer phase. If solvents are employed, they are preferably inert diluents, such as liquid ethane, liquid butane, liquid methyl or ethyl chloride, pentane and the like. These diluents are preferably utilized in proportion of from .5 to 5 volumes per volume of monomer.

The polymerization may also be carried out in aqueous emulsion or suspension systems. Suitable emulsifying agents or suspension agents to be employed in the water system include particularly the ionic surface active agents, especially those having a polar structure including a hydrophilic (predominantly hydrocarbon) residue and a charged (ionic) radical thereon, such as anionic surface-active compounds including the alkali metal and nitrogen-base soaps of higher fatty acids, such as potassium and/or sodium myristate, laurate and the like, as well as the surface-active compounds of the cation type, such as salts of long-chain aliphatic amines and quaternary ammonium bases, such as lauryl amine hydrochloride and the like. Non-ionic material, such as starch, gum-arabic, the polyoxyalkylene oxide condensates of hexitan anhydrides, carboxymethylcellulose, etc., may also be employed. The amount of the emulsifying agent preferably varies from about .1% to 10% by weight, and still more preferably from .5% to 5% by weight of the monomer. In the water systems, it is preferred to maintain the ratio of polymerizable material to water smaller than 1 to 2. It is also preferred in the aqueous emulsion systems to maintain agitation as by tumbling, stirring or other means during the radiation.

The process of the invention is preferably conducted in an inert atmosphere. This may be accomplished by use of high vacuum or by introduction of inert gases, such as nitrogen, and the like. However, as noted above the process has advantage over known techniques in that it is less sensitive to the presence of small amounts of oxygen.

When carrying out the process of the invention by means of radiation with a beam of particles, the reaction mixture is preferably contained in a cell constructed of a suitable material and having a window transparent to the beam. The reaction mixture may be irradiated statically or the mixture may be passed through a conduit having a window transparent to the beam so that it is irradiated in a flow system. In either case, provision is made to remove a small amount of gas, generally mainly hydrogen, which may be formed during the radiation. Table I illustrates suitable windows and cell construction materials to be used with various types of radiation. The whole cell or conduit within the field of radiation may be made of the transparent material.

TABLE I

| Radiation | Cell Material | Window |
|---|---|---|
| X or gamma | ¼" Al, ⅒" S.S. (or any other materials). | None needed. |
| Fast neutrons | Aluminum (or metal of low capture cross section). | Do. |
| Electrons | Any | Thin aluminum foil, thin S.S. foil, or other thin metals. |

In effecting radiation, the feed mixture may be introduced into the interior of a reactor, as, for example, in a well designed for that purpose or through a cooling tube or tubes.

The mixtures to be treated may be introduced into the reactor or into the path of the fast high energy beam in a continuous flow through a conduit, or may be placed in a receptacle in the reactor or in the path of the beam and subjected to irradiation while they are substantially static. When the liquid reaction mixture is placed in a reactor, it is preferred to stir or otherwise agitate the mixture so as to keep solid particles suspended in the liquid phase and circulate material in front of the beam.

The polymers may be recovered from the reaction mixture by any suitable means, such as filtration, distillation, extraction and the like. In case it is desired to remove the solid metal halide activators, the removal may be accomplished by thorough washing of the polymer or by dissolving the polymer in a suitable solvent and filtering.

The process of the invention may be utilized for the homopolymerization or copolymerization of any ethylenically unsaturated monomer, i.e., any monomer containing a $>C=C<$ group, and preferably a $CH_2=C<$ group. These materials may possess one or more ethylenic groups and may be aliphatic, cycloaliphatic, aromatic or heterocyclic in structure. Particularly superior results are obtained by the process of the invention when the monomer to be polymerized is one that can be polymerized by ionic polymerization, e.g., those can be polymerized to at least dimers by $AlCl_3$ at a low temperature, e.g., 10° C. to 90° C. Examples of monomers to be polymerized include, among others, isobutylene, isoamylene, styrene, vinyl acetate, alpha-methylstyrene, dichlorostyrene, methoxystyrene, isoprene, butadiene, methylpentadiene, methyl methacrylate, ethyl acrylate, vinyl chloride, allyl acetate, methacrylonitrile, vinyl chloride, vinyl alkyl ethers, as vinyl butyl ether, vinyl amyl ether, vinyl ketones as vinyl methyl ketone, acrylonitrile and the like. Especially preferred monomers to be employed include the alpha-olefins and polyolefins containing up to 8 carbon atoms, the alkyl, chloro and alkoxy-substituted styrenes and the acrylate esters.

The process of the invention may also be used to effect copolymerization of one or more of the above-described monomers with themselves or with other types of unsaturated monomers. Examples of these include, among others, ethylene, propylene, hexylene, decene, dodecene, piperylene, styrene, vinyl acetate, vinyl propionate, vinylbenzoate, diallyl phthalate, vinyl allyl phthalate, vinyl chloride, vinylidene chloride, methacrylonitrile, allyl amine, acrylamide, N-allyl acetamide, divinyl succinate, divinyl adipate, allyl acrylate, allyl butyl ether, allyl hexyl ether, diallyl ether, vinyl ethyl ketone, cyclohexenone, diacrylate ester of ethylene glycol, triallyl ether of glycerol, triallyl ether of hexanetriol and the like, and ethylenically unsaturated polyesters and alkyd resins.

In making the above-noted copolymers, it is generally preferred to utilize from 1% to 95% of the monomers capable of polymerizing by ionic polymerization with the remaining amount of the other type of monomer. Particularly preferred copolymers are those obtained by polymerizing at least 5% and preferably 5 to 95% by weight of an alpha-olefin or polyolefin with another olefin or polyolefin or an ethylenically unsaturated monomer substituted with an aromatic ring such as a styrene compound, or one substituted with an electronegative group, such as ester groups, halogen atoms, nitrile groups, ether groups and ketone groups. Copolymers having outstanding properties are those containing from 10% to 99% by weight of an alpha-olefin and the remainder being a polyolefin such as butadiene or isoprene.

The monomers employed in the process are preferably used in a purified form. This may be accomplished by distillation, scrubbing to remove $CO_2$ and the like.

In addition to polymerizing monomers, the process of the invention may also be used for the further polymerization of partially polymerized mixtures and for the cross-linking of already formed polymers. It may also be used to form graft and block-type copolymers.

The polymers prepared by the process of the invention will vary from thick liquids to hard solids. In general, they will have molecular weights of above 5,000 and preferably between 10,000 and 2,000,000, said molecular weights being determined by viscosity measurements in toluene.

The polymers produced by the process of the invention may be used for a great variety of important applications. They may be used in the formation of castings and moldings and in the preparation of coating and sealing compositions. The polymers prepared from the olefins and diolefins, such as the polymers of isobutylene, isoprene and the like, are particularly useful, for example, in the compounding of rubbers to form molded rubber articles, such as tires, belts, tubes and the like or may be added alone or with other polymeric materials as polystyrene to improve specific properties, such as impact resistance. The polymers of the invention may also be used in the preparation of impregnating and coating compositions or may be combined with asphalts, tars and the like to form surfacing coatings for roadways and walkways.

The polymers prepared by the process of the invention which contain some unsaturation, such as, for example, the copolymers of the isoolefins and the diolefins as isoprene and butadiene, are particularly valuable in that they may be vulcanized to form good cross-linked rubbers useful in making tires, etc. In forming rubbers of this type, it is preferred to compound the polymers with the necessary ingredients, such as, for example, tackifiers, plasticizers, stabilizers, oils, carbon black and the vulcanizing agent, and then heating the mixture. Preferred vulcanizing agents include, among others, sulfur, sulfur chloride, sulfur thiocyanate, thiuram polysulfides, and other organic polysulfides. These agents are preferably used in amounts varying from about 0.1 to 10 parts per 100 parts of rubber. Vulcanization temperatures range from about 100° C. to about 175° C. Preferred temperatures range from about 125° C. to 175° C. for a period of 15 to 60 minutes.

The homopolymers of the isoolefins may also be converted to vulcanizable products by chlorination and then dehydrochlorination by conventional procedures. The products so prepared may be vulcanizable as noted above.

The polymers and copolymers of the invention are also of particular value as additives for greases and oils and as viscosity index improvers and additives for extreme pressure lubricants.

A particular merit of rubbers produced from these polymers and copolymers is their resistance to chemical attack by oxygen or ozone. Another advantage is their low permeability to gases, which makes them especially suitable for use in inner tubes and the like.

To illustrate the manner in which the invention may be carried out, the following examples are given. It is to be understood, however, that the examples are for the purpose of illustration, and the invention is not to be regarded as limited to any of the specific conditions cited therein.

*Example I*

This example illustrates the polymerization of alpha-methylstyrene using a high energy X-ray beam in the presence of finely divided particles of lithium chloride containing about 1% water and a mesh size of 40–350.

0.5 part of lithium chloride was added to 1 part of purified alpha-methylstyrene and the mixture sealed in evacuated pyrex ampoule and the ampoule exposed to X-rays produced by impinging 3 mev. electrons on a gold target. The dose rate was about $6\times10^6$ rads per hour and the total dose was about $2\times10^6$ rads. The solid and liquid phases were mixed during radiation by mechanically tipping the ampoule back and forth. The temperature was maintained at −20° C. The resulting product was a solid high mol weight polymer of alpha-methylstyrene. The G value was 1500. In a similar experiment when the lithium chloride was omitted, the G value was only about 30.

*Example II*

Example I was repeated with the exception that the lithium chloride employed contained about 2% water and the alpha-methylstyrene was pretreated with silicon oxide. In this case also a high molecular weight poly(alpha-methylstyrene) was obtained. The G value was about 1500.

*Example III*

Example I was repeated with the exception that the lithium chloride was dried at 160° C. in stream of nitrogen and the alpha-methylstyrene was pretreated with silicon oxide. In this case also a high molecular weight poly(alpha-methylstyrene) was obtained. The G value was about 1200.

*Example IV*

Example I is repeated with the exception that the lithium chloride is replaced by a mixture of LiCl and $MgCl_2$. A higher G value is obtained.

*Example V*

This example illustrates the polymerization of alpha-methylstyrene using a high energy X-ray beam in the presence of finely divided lithium fluoride which had been dried at 160° C. and a mesh size of 50–300.

0.5 part of lithium fluoride was added to 1 part of purified alpha-methylstyrene and the mixture sealed in evacuated pyrex ampoule and the ampoule exposed to X-rays produced by impinging 3 mev. electrons on a gold target. The dose rate was about $6\times10^6$ rads and the total dose was about $2\times10^6$ rads. The solid and liquid phases were mixed during radiation by mechanically tipping the ampoule back and forth. The temperature was maintained at −20° C. The resulting product was a solid high molecular weight polymer of alpha-methylstyrene. The G value was about 2000.

*Example VI*

This example illustrates the polymerization of isobutylene using a high energy X-ray beam in the presence of finely divided lithium chloride containing not more than 1% water and a mesh size between 50 and 350.

5.6 parts of finely divided lithium chloride was added to 100 parts of purified liquid isobutylene and the mixture sealed in an evacuated ampoule and the ampoule exposed to X-rays produced by impinging 3 mev. electrons on a gold target. The dosage rate was $3.7\times10^5$ rads/hr. with a total dosage of $7.84\times10^4$ rads. The temperature maintained was −80° C. The solid and liquid phases were mixed during radiation by rotation of the ampoule. The resulting product was a non-tacky rubbery polymer having a molecular weight over 1,000,000 as determined by intrinsic viscosity measurements in toluene. G value was $3.5\times10^4$.

*Example VII*

Example VI was repeated with the exception that the lithium chloride was replaced with lithium fluoride. A non-tacky rubbery polymer was also obtained in a short period. G value was $1.2\times10^4$.

*Example VIII*

Examples I and VI are repeated with the exception that the amount of lithium salt is changed to 1.0% by weight of total charge. Related results are obtained.

*Example IX*

This example illustrates the preparation of a copolymer of isobutylene and isoprene using an electron beam from a Van de Graaff accelerator and lithium chloride as the finely divided solid material.

A mixture of 5 parts of purified isoprene and 95 parts of purified isobutylene and 1 part of lithium chloride containing 1% by weight of water are introduced into a reaction vessel and the temperature reduced to −80° C. The mixture is then irradiated in an electron beam from a Van de Graaff accelerator to a radiation dosage of $5\times10^5$ rads. This was accomplished at a dosage rate of $10^6$ rads per hour for 0.5 hour. The resulting product is a white solid polymer.

100 parts of the above polymer are compounded with 2 parts phenyl-beta-naphthylamine, 5 parts zinc oxide, 3 parts stearic acid, 50 parts high abrasion furnace black, 1.2 parts N-cyclohexyl-2-benzothiazole-sulfenamide and 0.8 part of sulfur, and the product cured for 20 minutes at 135° C. The resulting product is a hard rubber sheet than can be used in the formation of belts, tubes and the like.

*Example X*

Example IX is repeated with the exception that the isoprene is replaced with butadiene. Related results are obtained.

*Example XI*

Example I is repeated with the exception that the monomer mixture is irradiated by exposure to spent uranium reactor fuel elements. A solid polymer is also obtained.

*Example XII*

Example VI is repeated with the exception that 5 parts of the isobutylene is replaced with 5 parts of propylene. Related results are obtained.

*Example XIII*

Example I is repeated with the exception that the lithium chloride is replaced with equal amount of each of the following: lithium iodide, potassium bromide, potassium iodide, cesium chloride, cesium fluoride and lithium bromide. Related results are obtained.

*Example XIV*

This example illustrates the polymerization of isobutylene using a high energy X-ray beam in the presence of finely divided potassium chloride containing not more than 1% water and mesh size between 50 and 350.

5.0 parts of finely divided potassium chloride was added to 100 parts of purified liquid isobutylene and the mixture sealed in an evacuated ampoule and the ampoule exposed to X-rays produced by impinging 3 mev. electrons on a gold target. The dosage rate was $3.7\times10^5$ rads/hr. with a total dosage of $1\times10^6$ rads. The temperature maintained was −80° C. The solid and liquid phases were mixed during radiation by rotation of the ampoule. The resulting product was a non-tacky rubbery polymer having a molecular weight of 660,000. The G value was 1,110.

*Example XV*

Example XIV was repeated with the exception that sodium chloride was used as the solid material. The resulting polymer had a molecular weight of 320,000 and the G value was 1,000.

We claim as our invention:

1. A process for polymerizing ethylenically unsaturated monomers which consists of exposing at a temperature between —150° C. and about 0° C. the unsaturated monomer which is in contact with finely divided solid particles of an alkali metal halide to high energy ionizing radiation.

2. A process as in claim 1 wherein the finely divided solid particles comprise a lithium halide.

3. A process as in claim 1 wherein the finely divided solid particles is a potassium halide.

4. A process as in claim 1 wherein the finely divided solid particles have a mesh size between 40 and 600 and pore size of the order of 10 to 100 Angstroms.

5. A process as in claim 1 wherein the finely divided solid material is employed in an amount varying from 0.1% to 150% by weight of the monomer to be polymerized.

6. A process as in claim 1 wherein the finely divided solid material is lithium chloride.

7. A process as in claim 1 wherein the radiation employed varies from $10^5$ to $10^8$ rads.

8. A process as in claim 1 wherein the monomer to be polymerized is isobutylene.

9. A process as in claim 1 wherein the monomer to be polymerized is alpha-methylstyrene.

10. A process as in claim 1 wherein the monomer to be polymerized is a mixture of isobutylene and isoprene.

11. A process for polymerizing alpha-methylstyrene at a fast rate which consists of exposing the monomer which is in contact with a finely divided lithium halide to $10^4$ to $10^8$ rads of high energy ionizing radiation at a temperature between —80° C. to about 0° C.

12. A process as in claim 11 wherein the monomer is exposed to an electron beam.

13. A process as in claim 11 wherein the monomer is exposed to high energy photons.

14. A process as in claim 11 wherein the monomer is exposed to X-rays.

15. A process for copolymerizing isobutylene with a dissimilar ethylenically unsaturated monomer at a fast rate which consists of continuously exposing a mixture of isobutylene and dissimilar monomer which are in contact with a lithium halide to $10^5$ to $10^8$ rads of high energy ionizing radiation at a temperature between —80° C. and about 0° C.

16. A process as in claim 15 wherein the dissimilar monomer is propylene.

17. A process as in claim 15 wherein the dissimilar monomer is butadiene.

18. A process as in claim 15 wherein the dissimilar monomer is isoprene.

19. A process for polymerizing an unsaturated monomer capable of polymerization via an ionic polymerization mechanism which consists of contacting the monomer with high energy ionizing radiation and from 0.1% to 150% by weight of an alkali metal halide at a temperature between —150° C. and about 0° C.

20. A process as in claim 19 wherein the halide is lithium fluoride.

References Cited by the Examiner

UNITED STATES PATENTS

| | | | |
|---|---|---|---|
| 2,845,414 | 7/1958 | Schutze | 204—154 |
| 2,903,404 | 9/1959 | Oita et al. | 204—154 |
| 2,904,484 | 9/1959 | Houston et al. | 204—154 |
| 2,940,951 | 6/1960 | Ruskin | 204—154 |
| 2,951,796 | 9/1960 | Ruskin | 204—154 |
| 2,955,997 | 10/1960 | Allen et al. | 204—154 |
| 3,008,886 | 11/1961 | Sarantites | 204—154 |
| 3,057,791 | 10/1962 | Anderson | 204—154 |

SAMUEL H. BLECH, *Primary Examiner.*

JOSEPH REBOLD, MURRAY TILLMAN, *Examiners.*

N. F. OBLON, *Assistant Examiner.*